(12) United States Patent
Kang

(10) Patent No.: US 11,432,636 B2
(45) Date of Patent: Sep. 6, 2022

(54) MOBILE DEVICE-ATTACHABLE/DETACHABLE COSMETIC CASE

(71) Applicant: Ian Kang, Seoul (KR)

(72) Inventor: Ian Kang, Seoul (KR)

( * ) Notice: Subject to any disclaimer, the term of this patent is extended or adjusted under 35 U.S.C. 154(b) by 318 days.

(21) Appl. No.: 16/756,065

(22) PCT Filed: Oct. 22, 2018

(86) PCT No.: PCT/KR2018/012467
§ 371 (c)(1),
(2) Date: Apr. 14, 2020

(87) PCT Pub. No.: WO2019/083232
PCT Pub. Date: May 2, 2019

(65) Prior Publication Data
US 2020/0297098 A1    Sep. 24, 2020

(30) Foreign Application Priority Data

Oct. 23, 2017    (KR) .................. 20-2017-0005447

(51) Int. Cl.
*H04B 1/38*    (2015.01)
*A45D 40/18*    (2006.01)
(Continued)

(52) U.S. Cl.
CPC .............. *A45D 40/18* (2013.01); *H04M 1/04* (2013.01); *H04M 1/21* (2013.01)

(58) Field of Classification Search
CPC .. A45D 40/18; H04M 1/0206; H04M 1/0208; H04M 1/0243; H04M 1/21; H04M 1/1049
See application file for complete search history.

(56) References Cited

U.S. PATENT DOCUMENTS

| 8,602,039 B1 * | 12/2013 | Gindi .................. H04M 1/21 206/823 |
| 2007/0029225 A1 * | 2/2007 | Ko .................. G06F 1/1656 206/823 |

(Continued)

FOREIGN PATENT DOCUMENTS

| CN | 111225583 A | 6/2020 |
| JP | 2005296221 A | 10/2005 |

(Continued)

OTHER PUBLICATIONS

ISR issued in Int'l. Application No. PCT/KR2018/012467, mailed Jan. 28, 2019.

(Continued)

*Primary Examiner* — Tuan Pham
(74) *Attorney, Agent, or Firm* — Greer Burns & Crain Ltd.

(57) ABSTRACT

The present invention relates to a mobile device-attachable/detachable cosmetic case comprising: a cosmetic case having a first and a second palette coupled to each other in a tiltable and swivelable manner, the first and the second palette each having a reception portion for selectively receiving a tray for receiving the cosmetic or a mirror in an attachable/detachable manner; and a cradle which supports the cosmetic case and on which a mobile device is placed.

4 Claims, 5 Drawing Sheets

(51) Int. Cl.
 *H04M 1/04* (2006.01)
 *H04M 1/21* (2006.01)

(56) References Cited

U.S. PATENT DOCUMENTS

2009/0166247 A1 7/2009 Gindi
2011/0061675 A1* 3/2011 McKinley ............. A45D 33/20
 132/296

FOREIGN PATENT DOCUMENTS

| KR | 2020000005917 U | 4/2000 |
| KR | 1020090020361 A | 2/2009 |
| KR | 2020120003420 U | 5/2012 |
| KR | 1020130008317 A | 1/2013 |

OTHER PUBLICATIONS

Office action issued in corresponding Chinese Patent Application No. 201880067796.9, dated Feb. 23, 2022.

* cited by examiner

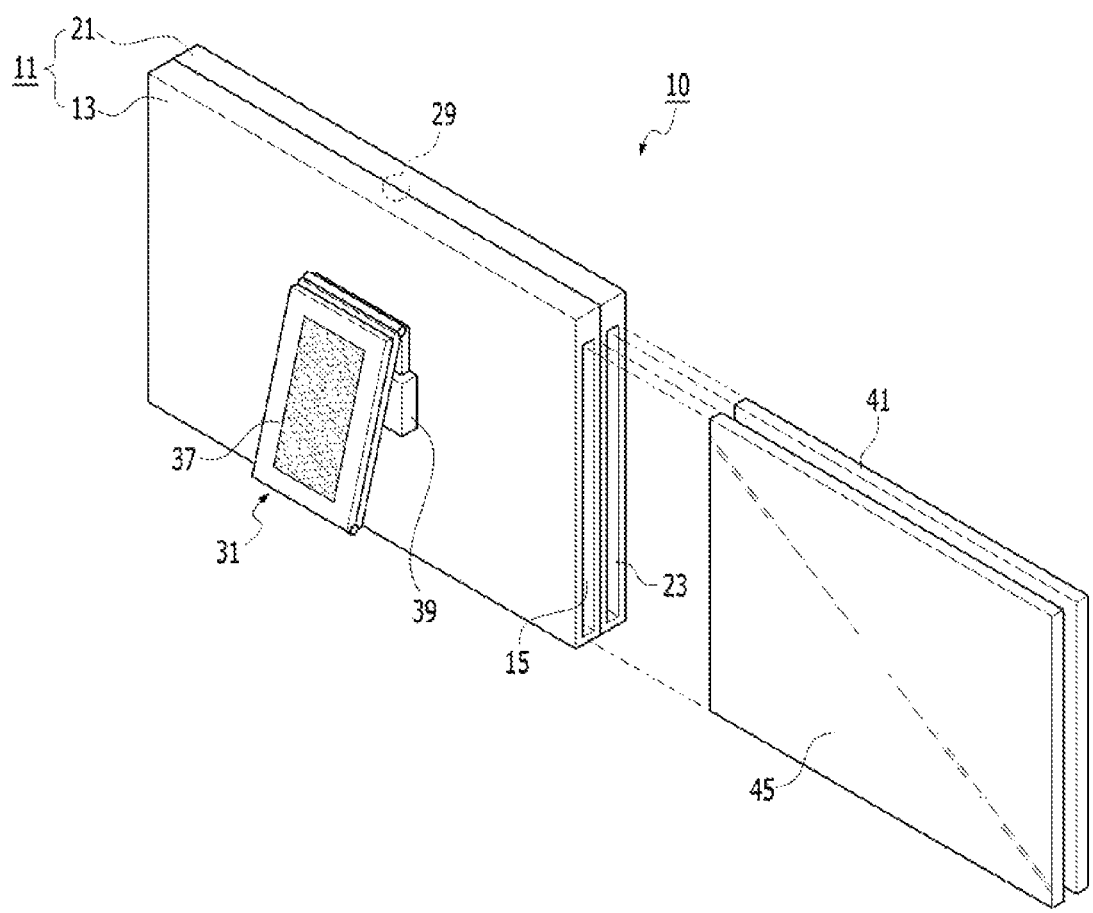
[FIG.1]

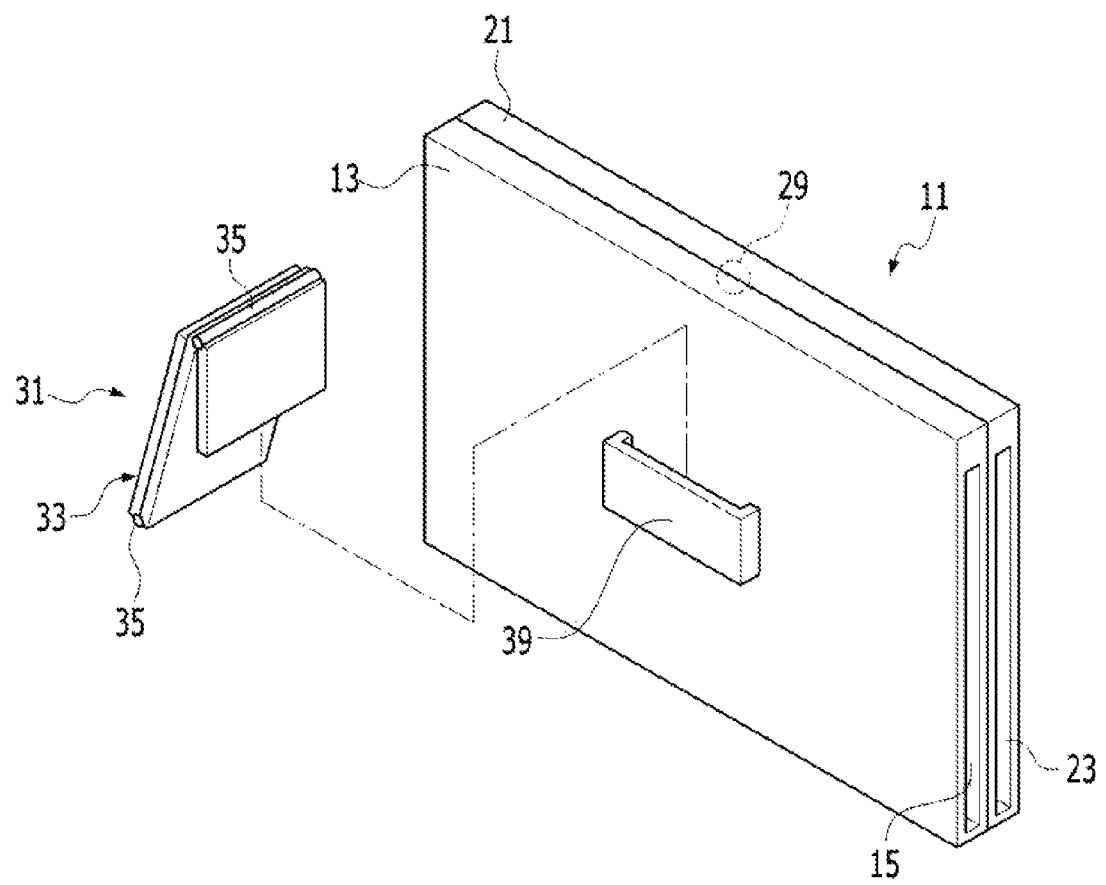

[FIG.3]
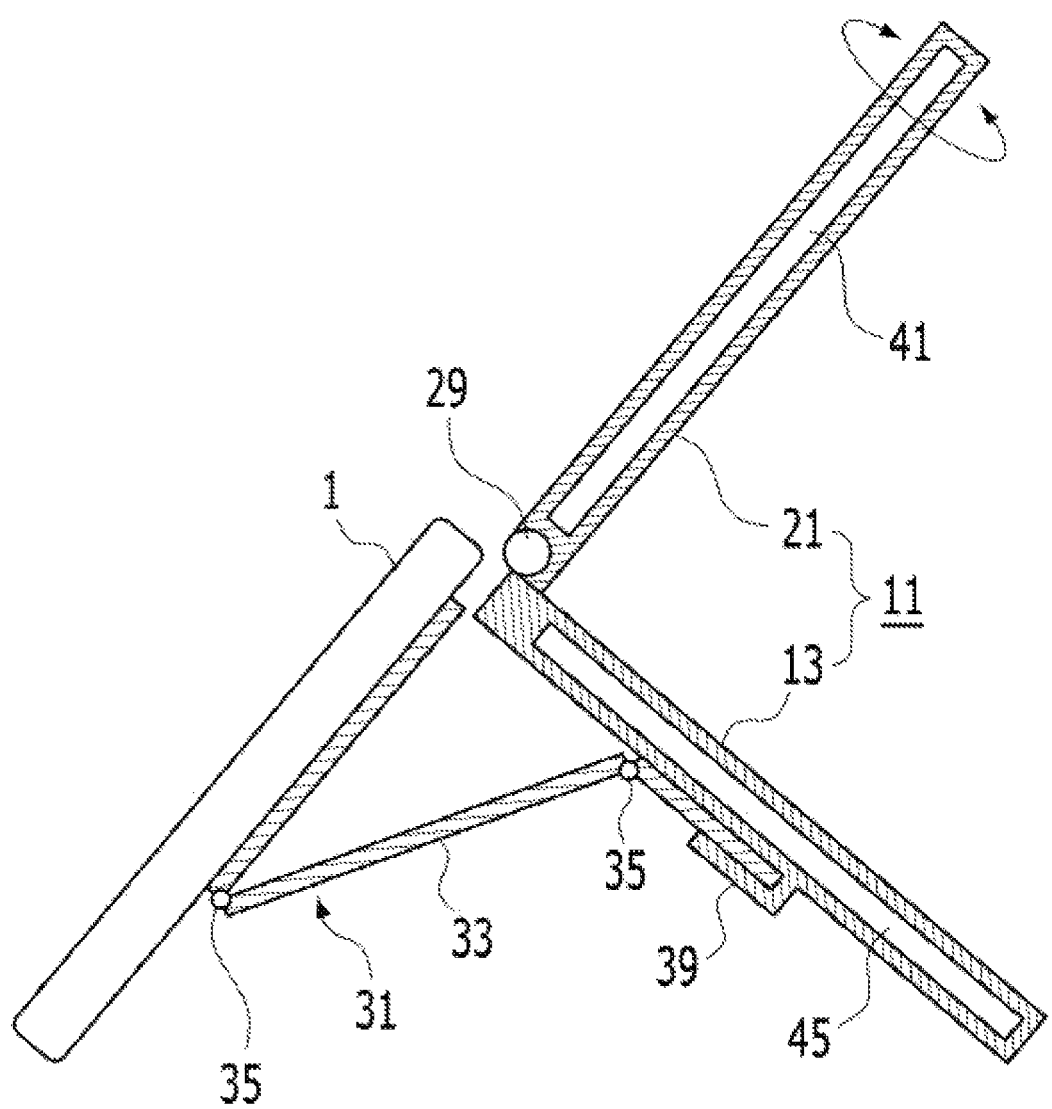

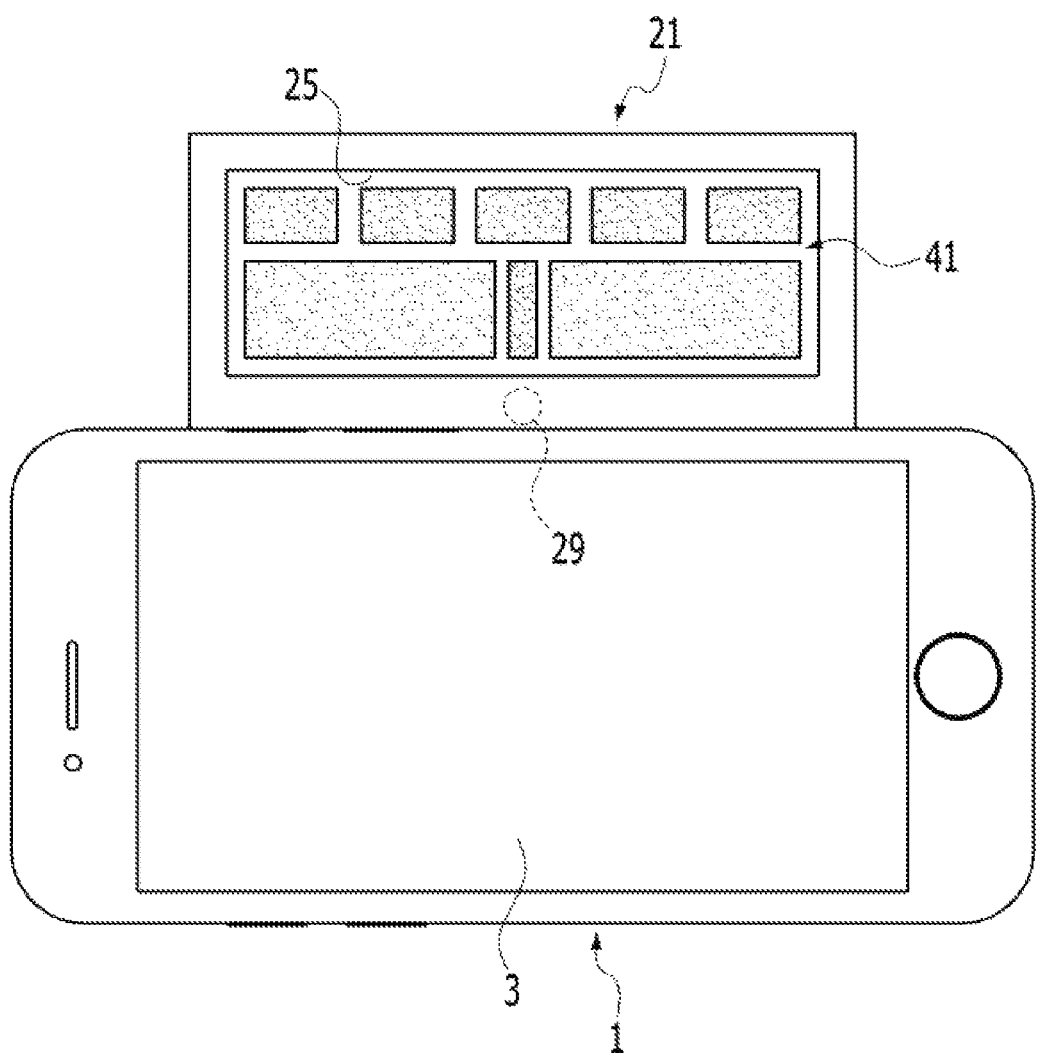
[FIG.4]

[FIG.5]
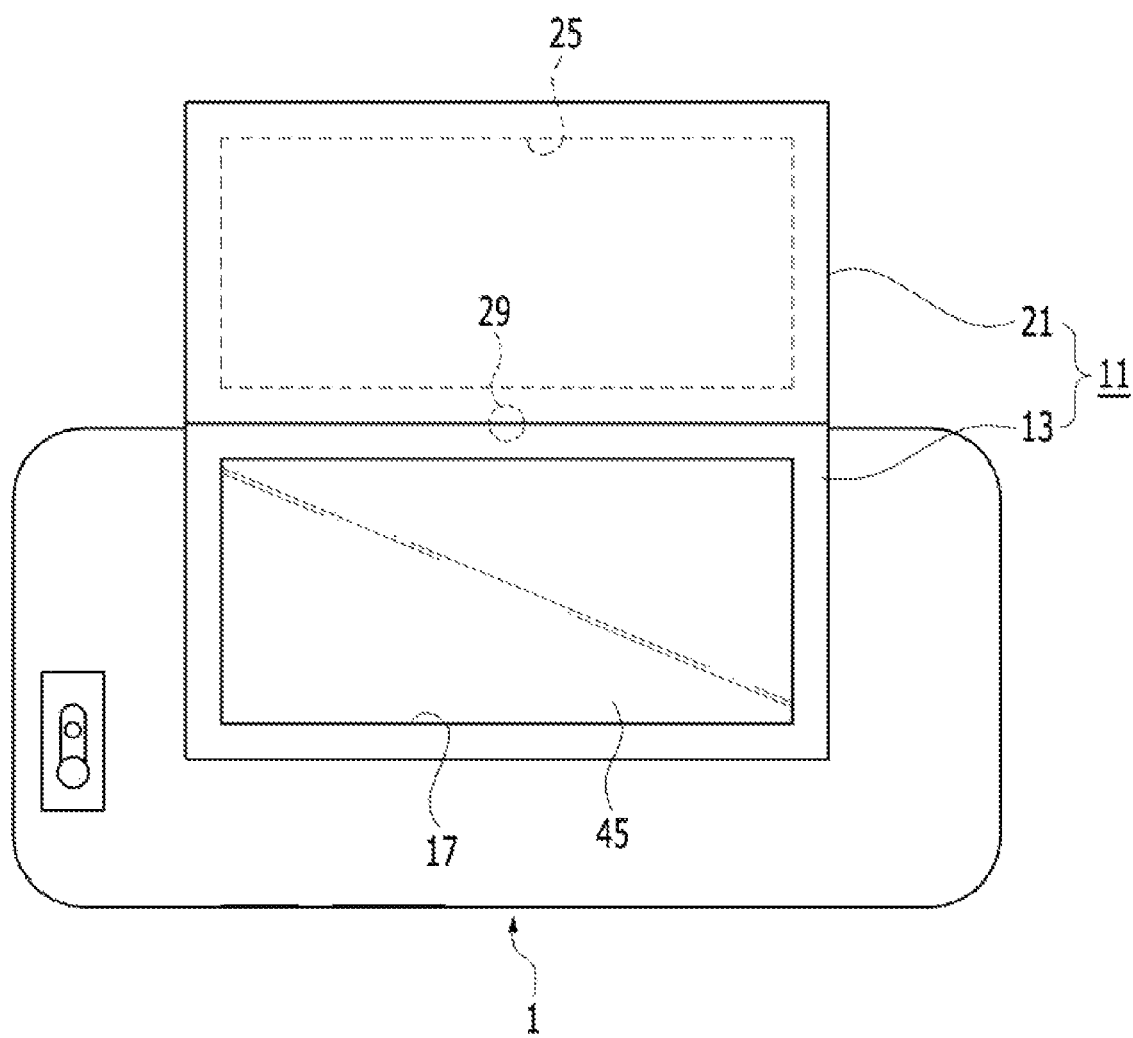

MOBILE DEVICE-ATTACHABLE/DETACHABLE COSMETIC CASE

TECHNICAL FIELD

The present invention relates to a mobile device-attachable/detachable cosmetic case, and more particularly to a mobile device-attachable/detachable cosmetic case configured such that a mobile device is held, and at the same time a display portion of the mobile device is used instead of a mirror such that a user may apply cosmetics.

BACKGROUND ART

In general, a cosmetic palette type cosmetic case is used in order to have various colors of cosmetic products, such as a lip gloss, a lipstick, an eye shadow, and a cheek rouge, in a wide tray, such as a compact, in several numbers by color.

That is, the cosmetic palette is a kind of cosmetic container developed such that a user can apply cosmetics in the state in which various colors of cosmetic products are accommodated in a single wide tray in order to solve inconvenience in that several kinds of color cosmetics must all be held.

Meanwhile, in recent years, people have enjoyed content, such as video, through a mobile device, such as a smartphone, without distinction of age or sex and regardless of time and place, and there are increasingly many cases in which individuals directly record makeup methods and upload the same online. With an increase in consumer's demand for screen enlargement, the size of a display portion, on which video clips are displayed, of a smartphone has been increased.

In addition, with an increase in size of the smartphone, a smartphone holder capable of enabling the smartphone to be used in the state of being easily held on a table has been widely popularized.

Accordingly, the applicant of the present application has developed a mobile device-attachable/detachable cosmetic case configured such that a cosmetic case and a holder are connected to each other in order to hold a mobile device, and at the same time a user can record her makeup procedure while applying cosmetics using the held mobile device.

DISCLOSURE

Technical Problem

The present invention has been made in view of the above problems, and it is an object of the present invention to provide a mobile device-attachable/detachable cosmetic case configured such that a mobile device is held, a palette having cosmetics accommodated therein is mounted, and a display portion of the held mobile device is used instead of a mirror, whereby a user may apply cosmetics using the cosmetics accommodated in the palette.

Technical Solution

The object of the present invention can be accomplished by the provision of a mobile device-attachable/detachable cosmetic case including a palette main body having a first palette and a second palette coupled to each other so as to be tilted and swiveled relative to each other, each of the first palette and the second palette being provided with a reception portion configured to selectively detachably receive a tray configured to accommodate cosmetics or a mirror therein, and a holder configured to support the palette main body and to hold a mobile device.

Advantageous Effects

According to the present invention, a mobile device is held, a palette having cosmetics accommodated therein is mounted, and a display portion of the held mobile device is used instead of a mirror, whereby a user may apply cosmetics using the cosmetics accommodated in the palette.

DESCRIPTION OF DRAWINGS

FIG. 1 is a perspective view of a mobile device-attachable/detachable cosmetic case according to an embodiment of the present invention.

FIG. 2 is a separate perspective view of an essential portion of FIG. 1.

FIG. 3 is a longitudinal sectional view showing the state in which the mobile device-attachable/detachable cosmetic case according to the embodiment of the present invention holds a mobile device.

FIG. 4 is a front view of FIG. 3.

FIG. 5 is a rear view of FIG. 3.

BEST MODE

The object of the present invention can be accomplished by the provision of a mobile device-attachable/detachable cosmetic case including a palette main body having a first palette and a second palette coupled to each other so as to be tilted and swiveled relative to each other, each of the first palette and the second palette being provided with a reception portion configured to selectively detachably receive a tray configured to accommodate cosmetics or a mirror therein, and a holder configured to support the palette main body and to hold a mobile device.

Here, the holder may include a holder main body configured to be folded or unfolded in multiple stages, a first coupling means configured to couple the holder main body to the mobile device, and a second coupling means configured to couple the holder main body to the palette main body.

The first coupling means may include at least one of double-sided tape or Velcro tape, and the second coupling means may include an insertion portion provided at one of the first palette and the second palette, a free end of the holder main body being inserted into the insertion portion.

Each of the first palette and the second palette may be provided with a window configured to allow the tray configured to accommodate the cosmetics or the mirror to be exposed therethrough.

MODE FOR INVENTION

Advantages and features of the present invention and a method of achieving the same will be more clearly understood from embodiments described below with reference to the accompanying drawings. However, the present invention is not limited to the following embodiments and may be implemented in various different forms. The embodiments are provided merely to complete the present invention and to fully provide a person having ordinary skill in the art to which the present invention pertains with the category of the present invention. The present invention is defined only by the category of the claims.

The terms used in this specification are provided only to explain embodiments, and do not limit the present invention. In this specification, a singular representation includes a plural representation unless it represents a definitely different meaning from the context. The terms "comprises" and/or "comprising" used in this specification do not preclude the presence or addition of one or more components other than mentioned components. The same reference numbers will be used throughout the specification to refer to the same or like elements, and the term "and/or" includes each of mentioned components and all combinations of one or more thereof.

All terms (including technical or scientific terms) have the same meanings as generally understood by a person having ordinary skill in the art to which the present invention pertains unless mentioned otherwise. In addition, terms defined in dictionaries that are generally used are not interpreted as having ideal or excessive meanings unless obviously specially defined.

Hereinafter, the present invention will be described in detail with reference to the accompanying drawings.

Prior to description, a smartphone is shown as a mobile device in the following embodiment. However, the present invention is not limited thereto, and a tablet may be applied as the mobile device.

FIGS. 1 to 5 show a mobile device-attachable/detachable cosmetic case according to an embodiment of the present invention.

As shown in these figures, the mobile device-attachable/detachable cosmetic case 10 according to the embodiment of the present invention includes a palette main body 11 and a holder 31.

The palette main body 11 includes a pair of palettes, each of which has a flat shape.

In the following description, the palette located at the lower side of FIG. 3 will be referred to as a first palette 13, and the palette located at the upper side of FIG. 3 will be referred to as a second palette 21, for convenience of description.

The first palette 13 and the second palette 21 are coupled to each other so as to be tilted and swiveled relative to each other via a ball-shaped pivot hinge 29. The pivot hinge 29 is provided at a border area between the first palette 13 and the second palette 21.

Consequently, the first palette 13 and the second palette 21 may be folded so as to face each other, as shown in FIG. 1, or the first palette 13 and the second palette 21 may be moved relative to each other about the pivot hinge 29 such that various tilt angles and rotation angles can be formed between the first palette 13 and the second palette 21, as shown in FIG. 3.

In addition, the first palette 13 and the second palette 21 are provided with reception portions 15 and 23, respectively, in each of which a tray 41 for accommodating cosmetics or a mirror 45 may be selectively detachably received.

Each of the tray 41 and the mirror 45 may have a rectangular flat shape having the same size and thickness as a corresponding one of the reception portions 15 and 23.

In particular, various colors of cosmetic products, such as a lip gloss, a lipstick, an eye shadow, and a cheek rouge, may be accommodated in the tray 41, or a single cosmetic product may be accommodated in the tray 41.

Windows 17 and 25, through each of which the tray 41 or the mirror 45 received in a corresponding one of the reception portions 15 and 23 is exposed, are formed in the reception portions 15 and 23 of the first palette 13 and the second palette 21.

In this embodiment, the mirror 45 is received in the reception portion 15 of the first palette 13, and the tray 41 is received in the reception portion 23 of the second palette 21. However, the present invention is not limited thereto. Only the tray 41 may be received in each of the reception portions 15 and 23 of the first palette 13 and the second palette 21.

The holder 31 supports the palette main body 11, and at the same time holds a mobile device 1. The holder 31 includes a holder main body 33, a first coupling means, and a second coupling means.

The holder main body 33 includes a plurality of flat members and a plurality of hinges 35. The plurality of flat members is disposed side by side in a line, and a pair of flat members adjacent to each other is coupled to each other via one of the hinges 35. Consequently, the holder main body 33 is folded or unfolded in multiple stages.

The first coupling means is configured to couple the holder main body 33 to the mobile device 1, and double-sided tape 37 is provided as the first coupling means. The double-sided tape 37 is provided at one end of the holder main body 33 that faces the mobile device 1. In this embodiment, the double-sided tape 37 is shown as the first coupling means. However, the present invention is not limited thereto. Velcro tape or a hook or hook recess for hook coupling may be provided as the first coupling means.

The second coupling means couples the holder main body 33 to the palette main body 11.

In this embodiment, an insertion portion 39 is formed at the rear surface of the first palette 13, e.g. the surface of the first palette 13 opposite to the window 17, as the second coupling means. The other end of the holder main body 33 is inserted into the insertion portion 39 so as to be coupled to the insertion portion by fitting, whereby the holder main body 33 and the palette main body 11 are connected to each other.

Although not shown, a band-shaped cover protruding vertically from the second palette 21 by a predetermined height may be provided along the edge of the second palette 21 such that a coupling area between the palette main body 11 and the holder 31 is not exposed outside when the palette main body 11 and the holder 31 are coupled to each other, as shown in FIG. 3, in order to improve the aesthetically pleasing external appearance of the mobile device-attachable/detachable cosmetic case.

In addition, although not shown, double-sided tape or Velcro tape may be provided as the second coupling means for coupling the holder main body 33 and the palette main body 11 to each other.

Hereinafter, a method of using the mobile device-attachable/detachable cosmetic case 10 according to the embodiment of the present invention constructed as described above will be described.

First, the holder main body 33 is coupled to the rear surface of the mobile device 1, e.g. the surface of the mobile device 1 opposite a display portion 3, via the double-sided tape 37.

Next, the mirror 45 is received in the reception portion 15 of the first palette 13 of the palette main body 11, and the tray 41 for accommodating cosmetics is received in the reception portion 23 of the second palette 21.

Then, the second palette 21 is tilted relative to the first palette 13 about the pivot hinge 29 such that the tray 41 of the second palette 21 and the mirror 45 of the first palette 13 are exposed.

Subsequently, the second palette 21 is swiveled relative to the first palette 13 about the pivot hinge 29 such that the tray 41 of the second palette 21 and the mirror 45 of the first palette 13 face in opposite directions.

Afterwards, the holder main body 33 is unfolded, and the free end of the holder main body 33 is inserted into the insertion portion 39 of the first palette 13 so as to be coupled to the insertion portion by fitting such that the holder main body 33 and the palette main body 11 are connected to each other.

At this time, the folding angle of the holder main body 33 is appropriately adjusted such that the mobile device 1 and the first palette 13 are supported on the floor while having a stable angle therebetween.

As a result, the mobile device 1 is held, and at the same time a user may apply cosmetics using the mobile device-attachable/detachable cosmetic case 10 according to the embodiment of the present invention.

That is, the user may use the display portion 3 of the held mobile device 1 instead of the mirror 45, and at the same time may apply the cosmetics in the tray 41 received in the second palette 21 exposed from the upper surface of the mobile device 1.

Hereinafter, another method of using the mobile device-attachable/detachable cosmetic case 10 according to the embodiment of the present invention will be briefly described. Unlike the above method, the holder main body 33 is coupled to the rear surface of the mobile device 1 via the double-sided tape 37, the holder main body 33 is unfolded, and the free end of the holder main body 33 is inserted into the insertion portion 39 of the first palette 13 so as to be coupled to the insertion portion by fitting such that the holder main body 33 and the palette main body 11 are connected to each other.

Subsequently, the second palette 21 is tilted relative to the first palette 13 about the pivot hinge 29 such that the tray 41 of the second palette 21 and the mirror 45 of the first palette 13 are exposed, and then the second palette 21 is swiveled relative to the first palette 13 about the pivot hinge 29 such that the tray 41 of the second palette 21 and the mirror 45 of the first palette 13 face in opposite directions. As a result, the mobile device 1 is held, and at the same time the user may apply cosmetics using the mobile device-attachable/detachable cosmetic case 10.

According to the present invention, as described above, the first palette and the second palette, in each of which the tray for accommodating cosmetics or the mirror is received, are coupled to each other so as to be tilted and swiveled relative to each other, and the mobile device is held by one of the first palette and the second palette using the holder, whereby the user may make apply the cosmetics accommodated in the palette while using the display portion of the held mobile device instead of the mirror.

Meanwhile, in the mobile device-attachable/detachable cosmetic case according to the embodiment of the present invention, the palette main body and the holder may be separated from each other such that the palette main body can be used independently as a general cosmetic palette type cosmetic case.

The embodiment of the present invention has been described with reference to the accompanying drawings; however, it will be apparent to those skilled in the art that the present invention may be embodied in specific forms other than those set forth herein without departing from the spirit and essential characteristics of the present invention. Therefore, the above embodiment should be construed in all aspects as illustrative and not restrictive.

The invention claimed is:

1. A mobile device attachable and detachable cosmetic case comprising:
   a palette main body having a first palette and a second palette coupled to each other so as to be tilted and swiveled relative to each other, each of the first palette and the second palette being provided with a reception portion configured to selectively detachably receive a tray configured to accommodate cosmetics or a mirror therein; and
   a holder configured to support the palette main body and to hold a mobile device.

2. The mobile device attachable and detachable cosmetic case according to claim 1, wherein the holder comprises:
   a holder main body configured to be folded or unfolded in multiple stages;
   a first coupling means configured to couple the holder main body to the mobile device; and
   a second coupling means configured to couple the holder main body to the palette main body.

3. The mobile device attachable and detachable cosmetic case according to claim 2, wherein
   the first coupling means comprises at least one of double-sided tape or Velcro tape, and
   the second coupling means comprises an insertion portion provided at one of the first palette and the second palette, a free end of the holder main body being inserted into the insertion portion.

4. The mobile device attachable and detachable cosmetic case according to claim 1, wherein each of the first palette and the second palette is provided with a window configured to allow the tray configured to accommodate the cosmetics or the mirror to be exposed therethrough.

\* \* \* \* \*